April 3, 1945. A. J. STOCK 2,372,746
AUTOMATIC APRON FED HOPPER SCALE FOR BULK MATERIAL
Filed Aug. 26, 1940 3 Sheets-Sheet 1
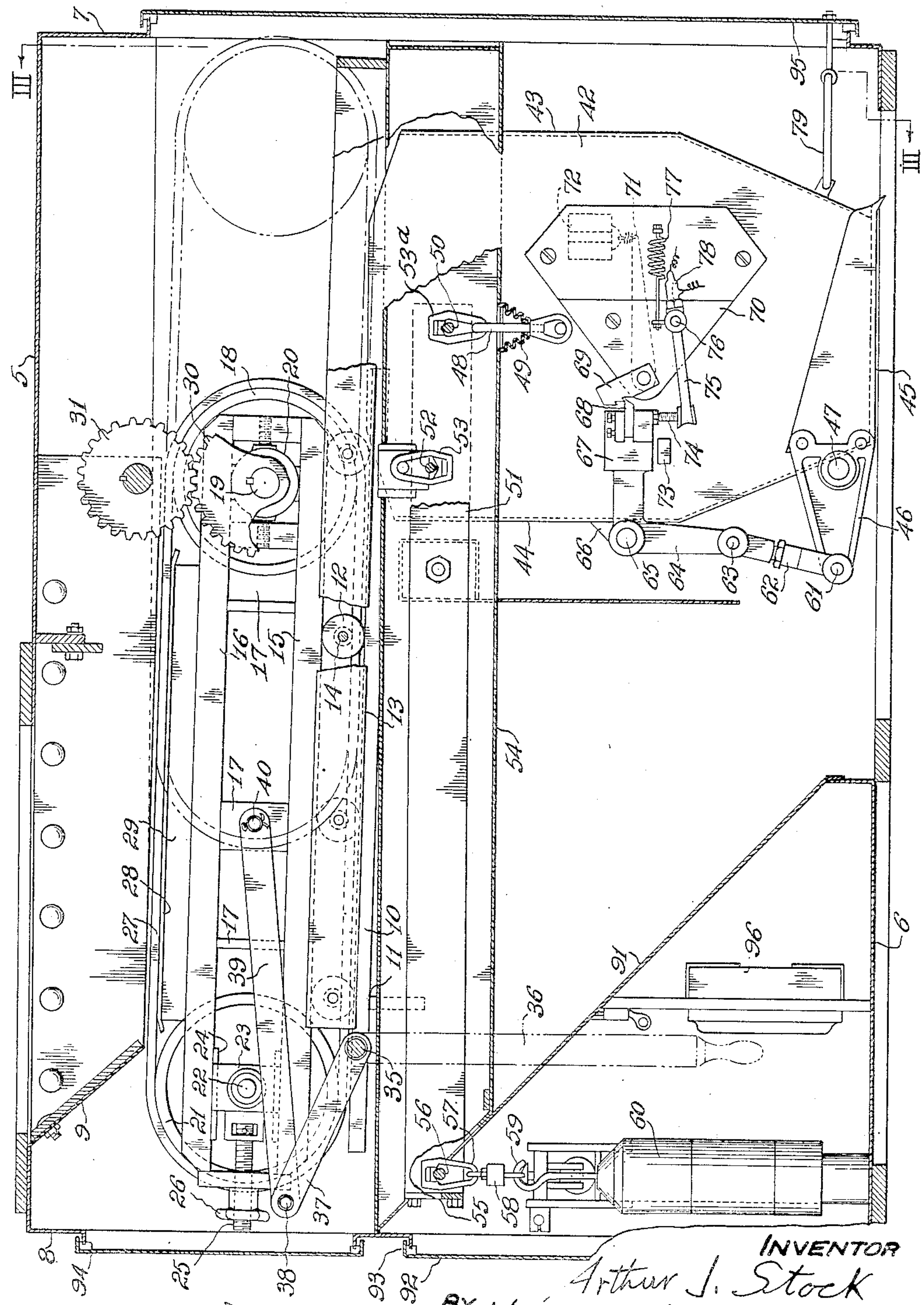
INVENTOR
Arthur J. Stock
BY Hawgood and Van Horn
HIS ATTORNEYS.

April 3, 1945. A. J. STOCK 2,372,746
AUTOMATIC APRON FED HOPPER SCALE FOR BULK MATERIAL
Filed Aug. 26, 1940 3 Sheets-Sheet 2
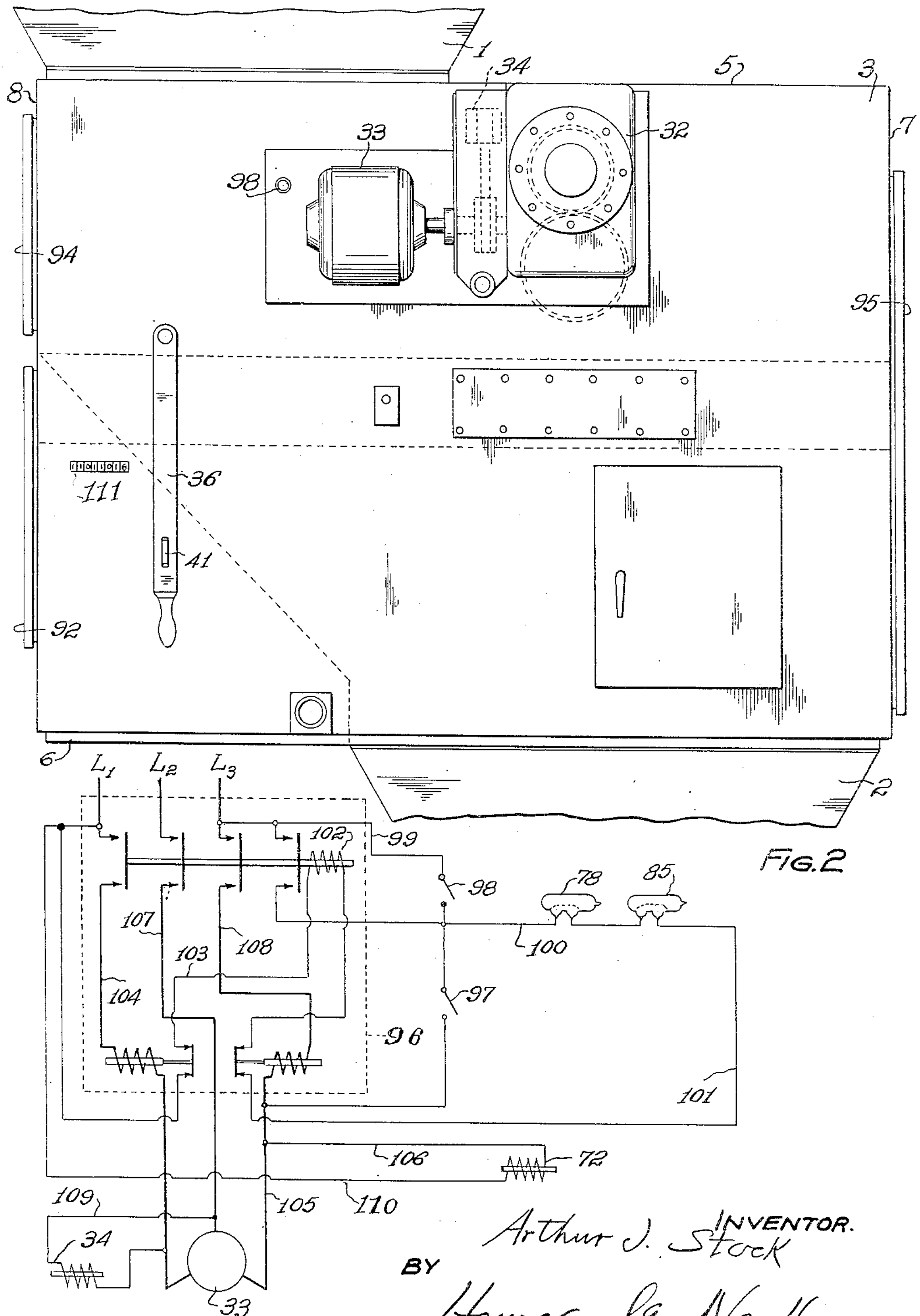
INVENTOR.
Arthur J. Stock
BY
Hawgood and Van Horn
HIS ATTORNEYS.

April 3, 1945. A. J. STOCK 2,372,746
AUTOMATIC APRON FED HOPPER SCALE FOR BULK MATERIAL
Filed Aug. 26, 1940 3 Sheets-Sheet 3
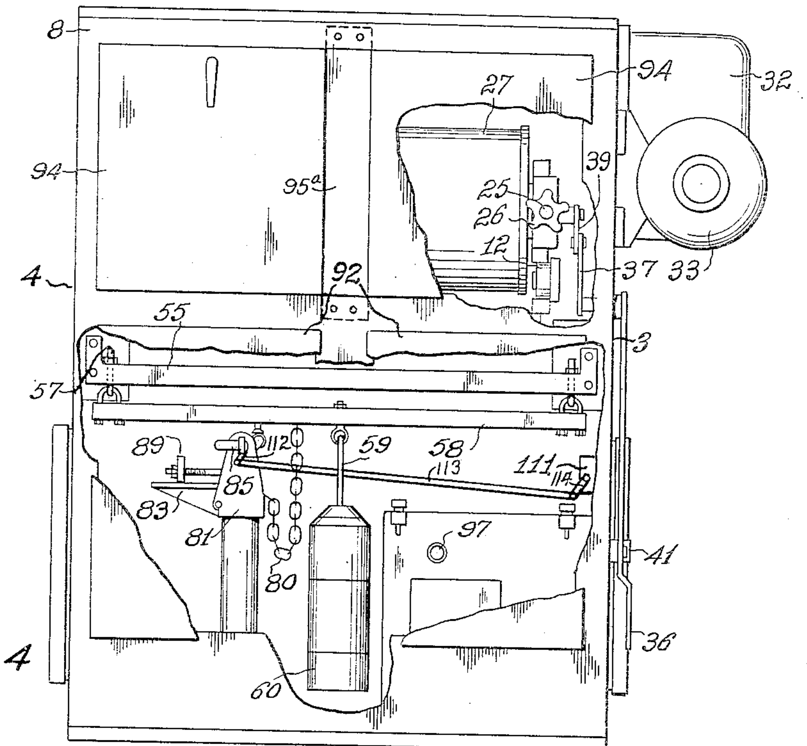
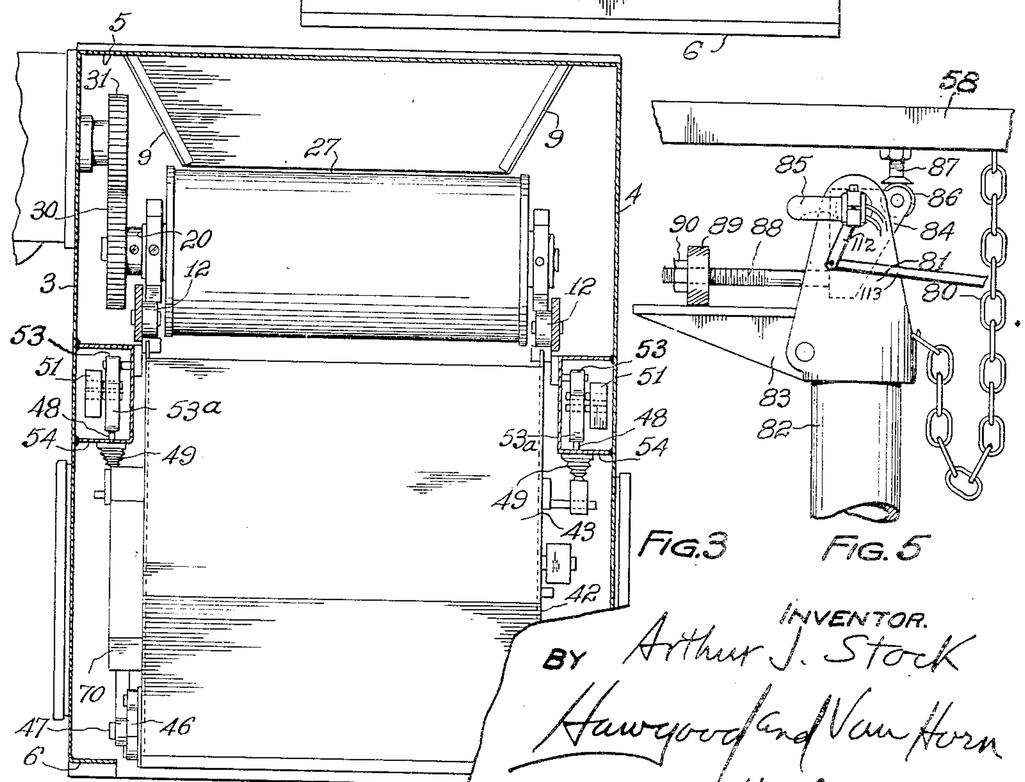

Patented Apr. 3, 1945

2,372,746

UNITED STATES PATENT OFFICE 2,372,746

AUTOMATIC APRON FED HOPPER SCALE FOR BULK MATERIALS

Arthur J. Stock, Rocky River, Ohio

Application August 26, 1940, Serial No. 354,148

15 Claims. (Cl. 249—1)

This invention relates to dispensing machines and more particularly to combined dispensing and weighing machines especially useful for the dispensing of coal, coke, or the like at the mines, in coal yards, at power plants or in other places where it is desired to measure and dispense aggregate materials.

The weighing of coal has long been accomplished in a rather crude way by weighing the wagons, trucks, or railroad cars in which it is shipped or by weighing separate containers filled with it by simply placing such containers on scales. The art eventually progressed beyond this stage and provided various relatively crude types of automatic weighing machines such as the one shown and described in U. S. Patent 1,066,656, granted July 8, 1913, to Henry Richardson. This automatic weighing machine comprised a container which was permanently supported on scales and which was adapted to be automatically filled to a point where the scales balanced, and then, automatically discharged. Up to the present time, however, all such devices have given off considerable dirt or dust in operation, have been unsightly in outward appearance, difficult to maintain because of the clogging of their parts with coal dust and other foreign materials, relatively inaccurate in their measurements and lacking in the combination of sufficient manually controlled flexibility with sufficient automaticity to prevent ordinary operating errors from causing inaccurate weighing.

The present invention comprises a new and improved apparatus for weighing and dispensing aggregate materials. The weighing and dispensing is entirely accomplished by this apparatus without the need of exposing the weighing mechanism to the dust that is almost certain to arise and the apparatus is a completely enclosed structure that exudes no dust, makes a minimum of noise and is a decoration rather than an eyesore to the establishment in which it is placed. Such an apparatus is particularly desirable in modern power plants where the emphasis is on cleanliness and efficiency.

Among the important features of this invention is the use of a belt conveyor to pass the incoming aggregate steadily and evenly into the weighing container or hopper. Another important feature is the arrangement of this belt conveyor so that it can be moved out of the path of the incoming aggregate to permit the aggregate to pass directly through the housing past the weighing hopper and out of the outlet opening of the housing without being weighed, if so desired. The change in position of the belt conveyor can be effected simply and easily by the movement of a single lever on the outside of the housing, thus making it possible for one not familiar with the apparatus to make the change without knowing anything about the operation of the mechanism. Furthermore, the belt conveyor is mounted so that it slopes downward from the inlet toward the weighing container so that water or any other liquid contained in the aggregate will drain off into the hopper and not flow off of the belt into the operating mechanism. Still further the conveyor is mounted so that it is readily accessible for adjustment and so that it may be readily removed from the housing for adjustment or the replacement of parts. The conveyor is so constructed that the conveyor belt may be of the endless variety and may readily be slipped on to the supporting wheels from the side.

The scales which support the weighing hopper are entirely enclosed in a dust proof housing from which supporting stirrups extend through dust tight but very flexible bellows to support the hopper. The scales may thus be quite accurate in their measurement and means are provided to adjust the scales to a very fine point to insure very great accuracy in the measurement of the aggregate. The operation of the device is controlled by electrical switches so arranged that they require practically no energy for their operation and thus cause no appreciable lag in the operation of the scales. An arrangement is provided to stop the feeding mechanism just a predetermined short time before the scales are balanced so that the last bit of material that dribbles off of the conveyor will bring the scales to exact balance.

The closure at the bottom of the hopper embodies still further improvements in that it is counterbalanced through a lever arrangement which has a very great mechanical advantage when the gate is closed or nearly closed and a very slight mechanical advantage when the gate is completely open or very nearly so. This lever arrangement also causes the gate to close slowly and smoothly at the end of its closing movement and stop slowly and smoothly at the end of its opening movement. It further gives the counterbalance such a great advantage at the end of the closing movement that the gate will crush small particles of aggregate that remain in its way, which is important because it is important that the gate completely close and lock so that the next cycle of operation can take place. It also relieves the gate locking means of most of the pressure of the aggregate in the hopper thus avoiding wear on the mechanism and the necessity of a heavy locking means.

The electrical circuit which operates the device of this invention is so arranged that a completion of the circuit by the closing of the operating switch serves to operate the device through a complete cycle even though the operating switch is opened before the cycle is completed, thus preventing accidental dumping of the hopper when only partly filled. A test switch is provided and so connected that by its use a full hopper of aggregate may be retained as long as it is desired. This permits the scales to be inspected to be certain that they are balancing properly and also makes possible easy adjustment to cause the exact weight desired to be dispensed. The test switch further serves as a safety switch, should the operating switch be closed and it thereafter becomes desirable to prevent the discharge from the device of the hopper of material.

Additional features and advantages of this invention will be apparent from the appended drawings and the following detailed description which show and describe the preferred embodiment of the new apparatus. It is to be understood, however, that the embodiment shown and described is but illustrative of the preferred embodiment and the principles of the invention, and that numerous modifications may be made without departing from the spirit of the invention or the scope intended to be included in the appended claims.

Figure 1 is a side sectional elevation of a preferred form of the apparatus, certain parts being broken away;

Figure 2 is a side elevation of the same apparatus, not in section, but drawn to a reduced scale.

Figure 3 is a sectional end elevation taken on the line III—III of Figure 1;

Figure 4 is an end elevation taken from the left hand end of Figure 1, certain parts being broken away;

Figure 5 is an enlarged fragmentary view of one of the switch operating mechanisms;

Figure 6 is a diagrammatic view of the electrical circuit of the apparatus.

The apparatus is intended to be arranged beneath a supply of solid aggregate material (such as coal), which may be fed to it through a hopper, a chute, or other desired means, while the apparatus itself will deliver this material to another hopper, such as that associated with a stoker mechanism, or a chute, or other device.

As illustrated in the drawings, the apparatus is arranged to receive material from a hopper 1 above it and to deliver the material to a second hopper 2 (Figure 2) positioned below it and offset slightly with respect to the first mentioned hopper.

The apparatus consists of an outer shell having vertical sides 3 and 4, a top 5, a bottom 6, and ends 7 and 8, these parts being conveniently formed of sheet metal bent and welded together to form a generally rectangular casing. This casing, which is dust tight, has an intake opening at its top, shown at the left in Figure 1, which may be sealed to the hopper or chute 1, and a discharge opening at its bottom, shown at the right in this figure, which may be sealed to chute or hopper 2.

Deflector plates 9 depend from the top of the casing to adjacent the feeding apparatus, to be hereinafter described, so as to direct the incoming aggregate into the feeding apparatus and prevent its going elsewhere.

Under the intake opening and extending transversely within the casing to a point above the outlet opening is a feeding or conveying unit comprising a belt type conveyor, this entire conveyor unit being supported so that it may be moved longitudinally.

The conveyor unit consists of two side frames, each including a lower side rail 15, an upper side rail 16, and three connecting cross plates 17. The two side frames are connected together by a transverse plate 28 having depending side flanges 29 secured to the upper side rails 16 so that the framework of the feeding or conveying unit forms an integral rigid structure, capable of properly supporting the conveying elements.

To support the conveyor so that it will be movable as desired a roller guideway is provided at each side of the conveyor, so positioned that the lower side rail 15 will be supported by a series of rollers 12, spaced along a guide rail 13 and supported therefrom by pivot pins 14. The guide rails 13 extend far enough upward alongside of the side rails 15 to guide the rails on the rollers and prevent sideward movement of the conveyor. The guide rails 13 in turn are supported by frame members 10, fastened to the sides of the housing by angle members 11.

The conveyor frame carries at its opposite ends a pair of wide pulleys 18 and 21 about which pulleys passes an endless belt 27. The belt is supported under its generally horizontal upper portion by the upper surface of the transverse plate 28 which, as previously mentioned, is a part of the conveyor frame. The wide pulley 18 is keyed to a shaft 19 supported in bearings 20 adjustably fixed within one pair of the ends to the side frames. The other wide pulley 21 is carried by a shaft 22, mounted in bearings 23 which are slidable in ways 24 in the opposite ends of the side frames. The position of these latter bearings may be adjusted by take-up screws 25 and hand-wheel nuts 26.

Secured to the shaft 19 and interiorly of the casing is a gear 30 meshing with a pinion 31. This pinion 31 is mounted on a shaft extending through the side of the housing and driven through a speed-reduction mechanism 32, consisting of a worm and worm wheel (the casing for which only is shown), by an electric motor 33 all on the outside of the housing. The motor is secured to the outer surface of the side 3 of the casing and the worm and worm wheel are enclosed in a housing which further includes a solenoid actuated brake 34.

It will be noted that the pinion 31 is arranged to engage the uppermost part of the gear 30, so that this gear may be moved with the conveyor to the right or to the left, as shown in Figure 1, out of mesh with the pinion.

Means for moving the conveyor are shown as consisting of a transverse shaft 35 having at one end thereof, outside of the housing, a lever 36 by which it may be oscillated. Immediately adjacent the inner sides of the housing, the shaft has fixed to it two crank arms 37 connected by pins 38 to the ends of links 39, the other ends of which are connected by pins 40 to the side frame members.

With the parts in the position shown in Figure 1, with the lever extending vertically downwardly, the gear and pinion are in mesh, so that the motor may drive the pulleys in a clockwise direction, carrying the coal or similar material from beneath the inlet opening to a point where it may drop clear of the conveyor belt into the hopper.

When the operator desires to permit the material to pass directly through the device without the use of the conveyor belt, he has merely to move the lever toward the left, as shown in Figure 1, upon which motion the levers and links operate to move the side frames toward the right, this movement being easily effected because of the rollers on which the side frames travel, until the conveyor belt is in the position indicated in dot and dash lines. At this time it is clear of the space beneath the inlet opening so that the aggregate may be dropped directly past the left hand end of the belt.

The lever is shown as having an opening formed therethrough which may be passed over a perforated lug 41 secured to the side 3 of the housing to maintain the lever in its normal position. A destructible seal or other fastening device may be inserted through a perforation of the lug to seal the lever 36 in place. This will allow the operator to move the lever at any time he desires, but will furnish a positive and accurate indication that he has so moved the lever.

While the lever and crank arms have been described as the means for shifting the position of the feeding or conveying unit, it will be apparent that any other desired means may be used for this purpose.

The inclination of the conveyor or feeder, as above mentioned, is downwardly toward the discharge opening end of the apparatus. It is such that any moisture which may find its way into the apparatus will drain along the top of the conveyor belt and/or its supporting plate 28 toward the discharge end of the conveyor, passing from this into the weighing container (to be hereinafter described) which preferably is made of corrosion resisting material. The moisture is thus guided in its path through the apparatus, so as to contact only materials suitable for the resisting of corrosion.

Beneath the discharge end of the belt is positioned a weighing container or hopper consisting of sides 42 and ends 43 and 44, this hopper or receptacle being open at the top and having an opening in its bottom which is normally covered by a pivoted closure or cover 45.

The container is suspended by loops or stirrups 48 passing through flexible bellows 49 and supported by loops or stirrups 53*a*, the upper ends of the stirrups 53*a* resting upon knife edges 50. The knife edges are located near the ends of two weigh beams 51, the beams themselves being supported by fulcrum knife edges 52 resting in loops 53 suspended from the casing within generally rectangular tubular covers 54.

These covers extend lengthwise of the beams, adjacent the sides of the casing and protect the weigh beams from dust and the like. They are closed at one end and sealed at the other to another dust proof compartment containing the scale mechanism.

The ends of the weigh beams remote from the weighing hopper are connected by a cross bar 55 which causes them to remain in parallelism. Adjacent this bar are knife edges 56 secured to the weigh beams on which are suspended loops 57 from which depends a transverse bar 58, from the center of which is suspended, by means of a hook 59, a balancing weight 60, which is within the compartment mentioned. This weight is chosen to properly balance the apparatus when a desired quantity of coal is contained within the receptacle, and thus accurately to weigh the same.

It will be seen that the weighing portion of the apparatus consists of a very simple balanced beam type of scale, the two beams being supported on the knife edges 52, the container being supported at one end of the beams on knife edges 50, and the counter-weights at the other end of the beams on knife edges 56.

By applying different weights to the hook 59, and a very simple calculation based upon the length of the respective lever arms from knife edges 50 and 56 to fulcrum knife edges 52, the scale may be set to balance with any desired quantity of coal in the container, up to the maximum capacity of the latter.

Attached to the horizontal bar 58 adjacent the counterweight 60 is one end of a chain 80, which, by the addition or removal of links, may be used as an adjustment to counterbalance the tare of the container and associated parts. The other end of this chain is attached to a bracket 81 carried by the upper end of a post 82, affixed to the housing. The same bracket also carries a supporting shelf 83, and above this a pivoted generally triangular piece 84 to which is secured a mercury switch 85 and a contracting roller 86.

The contacting roller is in the path of a set screw 87 threaded into the bottom of the bar 58. This set screw engages the roller and rocks piece 84 in a clockwise direction (as seen in Figures 4 and 5) when the bar 58 moves downwardly.

It will further be noted that the balance of the beams is not effected by any external force, except the very minute force necessary to compress the thin corrugated rubber bellows 49, and that this force is constant and may thus be counterbalanced.

It will be noted that no control apparatus is actually connected to the weigh beams or any part supported by them and, as will be hereafter pointed out, the one control switch which is actuated by these beams functions only as the crossbar 58 moves out of contact and becomes wholly free from any influence of the control mechanism. The hopper closure or gate 45 is supported by brackets 46 fixed to it and pivoted upon a transverse shaft 47 fixed to the lower edge of the weighing hopper or container.. It is operated by an adjustable link 62, which is connected to the outer end of arm 46 by pivot 61, and the upper end of which is connected by a pivoted pin 63 to the lower end of a bell crank lever 64. This lever is pivoted at 65 in a bearing 66 secured to the weighing hopper, and has a horizontal arm provided with a counterweight 67 which tends to move it to the position indicated in Figure 1, in which the other arm of the bell crank lever and the adjustable link 62 form a toggle nearly on dead center holding the closure 45 in its upper or closed position. A projecting lug 73 on the weighing hopper limits the downward motion of the counterweight 67.

A latch 68 is adjustably carried by the counterweighted arm of the bell crank, and when the closure closes, comes into position to be engaged by a latch 69 pivoted through the side of a dust tight compartment 70 secured to the side 42 of the container. The latch 69 connects through a pivoted lever 71 to a solenoid 72 electrically operated to close the latch during the operation of the motor 33. The weight of the lever 71 causes the latch to be released when the solenoid is not energized.

The counterweighted arm of the bell crank lever 64 has an adjustable set screw 74 arranged to engage the end of a lever 75 pivoted to the compartment 70 at 76. This arm is urged in a direction to contact the set screw by a spring 77 and carries with it a switch, shown as a mercury switch 78, for a purpose to be hereinafter described.

Links 79 (Figure 1, lower right hand corner) are provided between the bottom of the container and the end wall 7 of the casing, to prevent swinging of the container, while permitting it to move freely upwardly and downwardly.

Piece 84 is urged to rock in a counterclock-wise direction by a threaded shaft 88 carrying an adjustable weight 89 secured in place by a lock nut 90, the downward motion of this weight being limited upon its coming to rest upon the upper surface on shelf 83.

It will be noted that the weights, the transverse bars, the ends of the weigh beams, and the mechanism carried by post 82 are positioned in a generally triangular space at the left hand of the housing, as shown in Figure 1, being protected from the entrance of any dust or dirt by an inclined plate 91 which serves to guide the coal from the intake to the outlet openings when the coal is being passed directly through the apparatus, without the use of the belt conveying apparatus. This plate 91 is inclined to the horizontal by an angle equal to or greater than the angle of repose of the coal, to prevent any of it from lodging on the plate.

The rectangular spaces formed within beam covers 54 open into this triangular space, but have no openings at their other ends, excepting those covered by the flexible rubber bellows 49, so that all the weighing parts of the apparatus are carefully isolated from the parts in which the coal, dust, and the like are contained.

Within this space below the inclined plate 91 is also a motor starter 96, provided with a switch 97 for testing the apparatus.

A start-stop switch 98 is provided adjacent the motor 33.

A counter 111 is also provided on the outside of the apparatus and operated in accordance with the movement of the scale beams.

The space in which the weighing parts are enclosed is readily accessible through doors 92 which may be tightly sealed to the casing, by means of rubber or like gaskets 93.

Similar doors 94 provide access to the space enclosing the belt conveyor mechanism, while at the opposite end of the apparatus a single large door is provided which may be removed to give access both to the belt conveyor and the receptacle.

By opening both doors 94 and removing the mullion or stile like piece 95*a* between them, pivots 38 or 40 may be disconnected and the entire conveyor unit removed from the casing. It will be noted that the unit is so designed that an endless feeder belt may be slipped on to it sidewise eliminating any need for belt fastening.

The operation of the parts will be readily understood from the circuit diagram of Figure 6.

In this figure, the circuit is illustrated for a three-phase motor, the current coming from lines $L^1$, $L^2$, and $L^3$ and its passage to the motor 33 being controlled by the starter 96 indicated in the part bounded by the dotted line.

It will be apparent that on closing the starting switch 98, with the mercury switches 78 and 85 closed, current may flow from line $L^3$ through conductor 99, switch 98, conductor 100, switches 78 and 85, conductor 101, starter coil 102, and conductor 103 back to line $L^1$.

This flow energizes starter coil 102 and thus closes the starter contacts connecting lines $L^1$, $L^2$, and $L^3$ with lines 104, 107 and 108, respectively, as well as connecting line $L^3$ to conductor 100. The first three connections mentioned in the preceding sentence supply power to motor 33. Simultaneously current is able to pass from conductor 107 through conductor 109 to the brake operating solenoid 34, and through this to conductor 104, energizing the solenoid and releasing the brake. Also simultaneously, current may pass through conductor 106 to the latch controlling solenoid 72 and thence through conductor 110 back to line $L^1$, energizing the solenoid and locking latch 69. Thus, the starting of the motor instantaneously releases the brake and closes the latch.

The closing of the contacts between line $L^3$ and conductor 100 completes a circuit in parallel with that through conductor 99 and switch 98, so that opening of the switch 98 does not interrupt the operation of the motor.

Thus the motor will continue in operation until the pilot circuit 100 and 101 through which the starter coil 102 is energized becomes broken, which, in normal operation, is effected by the opening of the circuit by switch 85 controlled by the beam. Since this can happen only when the scale comes to balance with a full load in container 42, it will be obvious that improper manipulation of the start-stop switch cannot release the load in the container excepting at the end of a cycle, thereby preventing partial loads from being discharged and improperly recorded by the counter.

As soon as sufficient coal has been delivered to the container to balance the counterweight 60 and the reverse acting weight 89, this weight rises and arm 58 is moved upwardly, so that the set screw 87 allows roller 86 to rise until weight 89 rests upon shelf 83.

This counterclockwise motion of switch 85 breaks the circuit between conductors 100 and 101, which de-energizes coil 102, which is of the repulsion type, permitting the starter contacts to open between lines $L^1$, $L^2$ and $L^3$, and lines 104, 107 and 108, respectively, and restoring the parts to their original condition, stopping the motor and applying the brake. This action also releases solenoid 72, permitting latch 69 to release detent 68.

It has been pointed out that the adjustable weight 89 produces a counter thrust against the under side of the beam, tending to push the counter weighted end of the beam upward before a true balance is reached by the load in the container. This action is for the purpose of counter-balancing a small amount of material that dribbles off the discharging end of the conveyor belt after the belt comes to a stop. The volume of material thus falling off the belt is substantially uniform and the adjustment of weight 89 is necessary to compensate for change in density of the material being weighed.

The action previously described, which causes rocking movement on the part of switch 85, also causes rocking movement of a link 112 which is pivotally connected to a rod 113 which, at its other end is pivotally connected to operating link 114 of the counter 111. Every time weight 89 is moved in an arcuate sense, reciprocation of rod 113 is caused resulting in an actuation of the counter which, itself, may be of any conventional design.

The weight of the aggregate upon closure 45 causes the toggle composed of arms 62 and 64 to "break" permitting the closure to open and the coal to pass out through the bottom of the container. This motion also permits arm 75 to rock in a clockwise direction, opening switch 78, so that the circuits cannot be re-established until the closure is again in its upper horizontal position. This prevents the accidental delivery of coal at any time when the closure 45 is open.

It will be apparent that when the closure is in the open position that the counter weight 67 on the end of the bell crank 64 is in a position nearly vertically over the shaft 65 and is thus in a position of low mechanical advantage. It thus produces but a very slight force tending to restore the closure to the normal closed position. The closure will be held open by the resistance of the pile of material discharged from the container until removed from the vicinity of the discharge end of the scale.

Since the force tending to close the closure is slight, there is little tendency for it to push through the pile of discharged material, thus scooping up a portion of already weighed material and forcing it into the container to be erroneously weighed again.

Due to the toggle-like action and to the fact that the toggle is nearly on center as the closure reaches its horizontal position while the weight is at about its maximum distance to the side of shaft 65, a great mechanical advantage is obtained which is capable of actually crushing particles of coal which have lodged between the bottom of the closure and the container. Also, since the toggle has such a great mechanical advantage, the counterbalance can balance a large part of the load of aggregate and the latch mechanism is not subjected to great wear or strain and need not be particularly heavy. When it is desired to check the balance of the apparatus, the test switch 97 and the operating switch 98 are closed. This supplies power to the latch solenoid 72 even after switches 78 and 85 open and thus causes the container to retain its charge of coal until the balance of the scales can be verified.

While I have described the illustrated embodiment of my invention in some particularity, obviously many others will readily occur to those skilled in the art to which this appertains, and I therefore do not limit myself to the precise details shown and described herein, but claim as my invention all embodiments, modifications and variations coming within the scope of the appended claims.

I claim:

1. A solid material handling device comprising a supporting framework having closed sides and ends and having its top closed excepting for a material inlet, and its bottom closed excepting for a material discharge opening, said inlet and discharge opening being partially out of alignment, laterally extending conveying means interposed between said openings, a weighing hopper beneath one end of said conveying means and in alignment with part of the discharge opening, the discharge opening extending into alignment with and underneath a portion of the inlet under the conveying means, said conveying means being normally arranged to receive material from said inlet and deliver it to said weighing hopper and said hopper being arranged to deliver material to said discharge opening, an inclined baffle extending from side to side of the framework underneath a portion of the inlet opening and dividing the interior of the container into two compartments, one of which includes the conveying means and the weighing hopper and with which both openings communicate, a generally horizontal tubular casing extending into the conveyor containing compartment and communicating with the other compartment, weighing mechanism in the last mentioned compartment and the tubular casing, and supporting means connected to said weighing mechanism and extending through a wall of the tubular casing, said supporting means carrying said weighing hopper.

2. A solid material handling device comprising a substantially dust-proof housing having closed sides and ends and having its top closed excepting for a material inlet, and its bottom closed excepting for a material discharge opening, said inlet and discharge opening being partially out of alignment, laterally extending conveying means interposed between said openings, a weighing hopper beneath one end of said conveying means and in alignment with part of the discharge opening, the discharge opening extending into alignment with and underneath a portion of the inlet under the conveying means, said conveying means being normally arranged to receive material from said inlet and deliver it to said weighing hopper and said hopper being arranged to deliver material to said discharge opening, means for bodily moving said conveying means laterally of said inlet to permit material from said inlet to by-pass said conveying means in said weighing hopper and to discharge directly into said discharge opening, an inclined baffle extending from side to side of the framework underneath a portion of the inlet opening and dividing the interior of the container into two compartments, one of which includes the conveying means and the weighing hopper and with which both openings communicate, a generally horizontal tubular casing extending into the conveyor containing compartment and communicating with the other compartment, weighing mechanism in the last mentioned compartment and the tubular casing, and supporting means connected to said weighing mechanism and extending through a wall of the tubular casing, said supporting means carrying said weighing hopper, and sealing means interposed between said supporting means and said tubular casing.

3. Weighing means comprising a supporting frame having closed sides and ends, and having its top closed excepting for a material inlet, and its bottom closed excepting for a material discharge opening, laterally extending conveying means interposed between said openings, a wall across said framework beneath said conveying means and dividing the interior of the framework into two compartments one of which includes the conveying means, a tubular casing extending into the last named compartment and opening into the other compartment only, a weighing beam fulcrumed in said tubular casing and projecting into the last mentioned compartment, a weighing hopper in the compartment which includes the conveying means, said conveying means being normally arranged to receive material from said inlet and deliver it to said weighing hopper and said hopper being arranged to deliver material to said discharge opening, a supporting connection extending through and sealed to the tubular casing and connecting the weighing hopper to the weighing beam.

4. Weighing means comprising a supporting frame having closed sides and ends, and having its top closed excepting for a material inlet, and its bottom closed excepting for a material discharge opening, laterally extending conveying means interposed between said openings, a wall across said framework beneath said conveying means and dividing the interior of the framework into two compartments one of which includes the conveying means, a tubular casing extending into the last named compartment and opening into the other compartment only, a weighing beam fulcrumed in said tubular casing and projecting into the last mentioned compartment, a weighing hopper in the compartment which includes the conveying means, said conveying means being normally arranged to receive material from said inlet and deliver it to said weighing hopper and said hopper being arranged to deliver material to said discharge opening, a supporting connection extending through and sealed to the tubular casing and connecting the weighing hopper to the weighing beam, a weight carried by the end of the beam within the second mentioned compartment, and control means associated with said end of the beam and operable to stop the conveying means when a predetermined load of material has been received by the weighing hopper.

5. Weighing means comprising a supporting frame having closed sides and ends, and having its top closed excepting for a material inlet, and its bottom closed excepting for a material discharge opening, laterally extending conveying means interposed between said openings, a wall across said framework beneath said conveying means and dividing the interior of the framework into two compartments one of which includes the conveying means, a tubular casing extending into the last named compartment and opening into the other compartment only, a weighing beam fulcrumed in said tubular casing and projecting into the last mentioned compartment, a weighing hopper in the compartment which includes the conveying means, said conveying means being normally arranged to receive material from said inlet and deliver it to said weighing hopper and said hopper being arranged to deliver material to said discharge opening, a supporting connection extending through the tubular casing and connecting the weighing hopper to the weighing beam, a weight carried by the end of the beam within the second mentioned compartment, control means associated with said end of the beam and operable to stop the conveying means when a predetermined load of material has been received by the weighing hopper, and discharging means associated with said weighing hopper and controlled by said control means.

6. A device for dispensing solid aggregate material comprising an inlet structure for the material, a lateral conveyor unit normally positioned below said inlet structure so as to receive material therefrom, means for movably mounting said conveyor unit on said device, weighing mechanism normally positioned below the discharge end of said conveyor and arranged to receive material therefrom, means to shift said conveyor unit laterally of said inlet structure on said mounting means, a discharge structure under said inlet structure below the level of said conveyor and under said weighing mechanism so as to provide a discharge opening under said weighing mechanism and also a by-pass around said weighing mechanism and conveyor unit when the conveyor unit is shifted laterally of said inlet, means for stopping said conveyor when a predetermined load has reached the weighing mechanism, means for discharging said load from the mechanism and means for starting said conveyor again after said load has been discharged, said weighing mechanism comprising a weighing hopper supported on scales, said means for stopping said conveyor comprising an electrical switch operated by said scales, said means for discharging said load from said weighing mechanism comprising a gate in the bottom of said hopper and a releasable latch mechanism for said gate controlled by the switch operated by the scales, and said means for starting the conveyor again after the load has been discharged comprising an electrical switch operated by the closing of the gate on the hopper.

7. A device for dispensing solid aggregate material comprising an inlet structure for the material, a lateral conveyor unit of the endless belt type normally positioned below said inlet structure so as to receive material therefrom, means for movably mounting said conveyor unit on said device, a weighing mechanism normally positioned below the discharge end of said conveyor and arranged to receive material therefrom, means for driving said conveyor, means to shift said conveyor unit bodily to one side of said inlet structure, and a discharge structure under said inlet structure below the level of said conveyor unit and under said weighing mechanism so as to provide a discharge opening under said weighing mechanism and also a by-pass around said weighing mechanism and conveyor unit when said conveyor unit is shifted to one side of said inlet.

8. A device for dispensing solid aggregate material comprising an inlet structure for the material, a lateral conveyor unit of the endless belt type normally positioned below said inlet structure so as to receive material therefrom, means for movably mounting said conveyor unit in said device, weighing mechanism normally positioned below the discharge end of said conveyor and arranged to receive material therefrom, a discharge structure extending below both the inlet structure and the weighing mechanism and arranged to receive material from said weighing mechanism, means for driving said conveyor, means for bodily shifting said conveyor unit laterally of said inlet structure on said mounting means to disconnect said conveyor from said driving means and to permit material from said inlet structure to by-pass said conveyor unit and said weighing mechanism and to discharge directly into said discharge structure, for stopping the conveyor when a predetermined load of material has been received by the weighing mechanism, means for then discharging the load from the weighing mechanism, and means for restarting the conveyor.

9. A device for dispensing solid aggregate material comprising an inlet structure for the material, a weighing mechanism disposed below and to one side of said inlet structure, a discharge structure extending below both the inlet structure and the weighing mechanism, a lateral conveyor unit normally arranged to receive material from said inlet structure and to deliver it to said weighing mechanism, means for movably mounting said conveyor unit in said device, said weighing mechanism being arranged to deliver material to said discharge structure in batches of predetermined weight, and means for bodily moving said conveyor unit laterally of said inlet structure on said mounting means to permit material from said inlet structure to by-pass said conveyor unit and said weighing mechanism and to discharge directly into said discharge structure.

10. A device for dispensing solid aggregate material comprising an inlet structure for the material, a weighing mechanism disposed below and to one side of said inlet structure, a discharge structure extending below both the inlet structure and the weighing mechanism, a lateral conveyor unit of the endless belt type normally arranged to receive and control discharge of material from said inlet structure and to deliver said material to said weighing mechanism, means for movably mounting said conveyor unit in said device, said weighing mechanism being arranged to deliver material to said discharge structure in batches of predetermined weight, and means for bodily moving said conveyor unit laterally of said inlet structure on said mounting means to permit material from said inlet structure to by-pass said conveyor unit and said weighing mechanism and to discharge directly into said discharge structure.

11. A device for dispensing solid aggregate material comprising an inlet structure for the material, a weighing mechanism disposed below and to one side of said inlet structure, a discharge structure extending below both the inlet structure and the weighing mechanism, a lateral conveyor unit of the endless belt type normally arranged to receive and control discharge of material from said inlet structure and to deliver said material to said weighing mechanism, means for movably mounting said conveyor unit in said device, said weighing mechanism being arranged to deliver material to said discharge structure in batches of predetermined weight, means for driving said conveyor, means for stopping said conveyor when a predetermined load has reached the weighing mechanism, means for discharging said load from the weighing mechanism, means for starting said conveyor again after said load has been discharged, and means for bodily moving said conveyor unit laterally of said inlet structure on said mounting means to permit material from said inlet structure to by-pass said conveyor unit and said weighing mechanism and to discharge directly into said discharge structure.

12. A device for dispensing solid aggregate material comprising an inlet structure for the material, a lateral conveyor unit normally positioned below said inlet structure so as to receive material therefrom, means for movably mounting said conveyor on said device, weighing mechanism normally positioned below the discharge end of said conveyor and arranged to receive material therefrom, means to shift said conveyor unit laterally of said inlet structure on said mounting means, a discharge structure under said inlet structure below the level of said conveyor unit and under said weighing mechanism so as to provide a discharge opening under said weighing mechanism and also a by-pass around said weighing mechanism and conveyor unit when the conveyor unit is shifted laterally of said inlet on said mounting means, means for stopping said conveyor when a predetermined load has reached the weighing mechanism, means for discharging said load from the mechanism and means for starting said conveyor again after said load has been discharged, said weighing mechanism comprising a weighing hopper supported on scales, said means for stopping said conveyor comprising an electrical switch operated by said scales, said means for discharging said load from said weighing mechanism comprising a gate in the bottom of said hopper and a releasable latch mechanism for said gate controlled by the switch operated by the scales, said releasable latch mechanism including an electromagnet which holds said latch in latching position when energized, and said means for starting the conveyor again after the load has been discharged comprising an electrical switch operated by the closing of the gate on the hopper.

13. A device for dispensing solid aggregate material comprising an inlet structure for the material, a weighing mechanism disposed below and to one side of said inlet structure, a discharge structure extending below both the inlet structure and the weighing mechanism, a lateral conveyor unit of the endless belt type normally arranged to receive and control discharge of material from said inlet structure and to deliver said material to said weighing mechanism, means for movably mounting said conveyor unit in said device, said weighing mechanism being arranged to deliver material to said discharge structure in batches of predetermined weight, means for bodily moving said conveyor unit laterally of said inlet structure on said mounting means to permit material from said inlet structure to by-pass said conveyor unit and said weighing mechanism and to discharge directly into said discharge structure, means for driving said conveyor, means for stopping said conveyor when a predetermined load has reached the weighing mechanism, means for discharging said load from the weighing mechanism, and means for starting said conveyor again after said load has been discharged, said weighing mechanism comprising a weighing hopper supported on scales, said means for stopping said conveyor comprising an electrical switch operated by said scales, said means for discharging said load from said weighing mechanism comprising a gate in the bottom of said hopper and a releasable latch mechanism for said gate controlled by the switch operated by the scales, said releasable latch mechanism including an electromagnet which holds said latch in latching position when energized, and said means for starting the conveyor again after the load has been discharged comprising an electrical switch operated by the closing of the gate on the hopper.

14. A device for dispensing solid aggregate material comprising an inlet structure for the material, a framework mounted in said device and arranged with rollers, a lateral conveyor unit movably mounted on said rollers and normally positioned below said inlet structure so as to receive material therefrom, weighing mechanism normally positioned below the discharge end of said conveyor unit and arranged to receive material therefrom, means to shift said conveyor unit laterally of said inlet structure on said rollers, a discharge structure under said inlet structure below the level of said conveyor unit and under said weighing mechanism so as to provide a discharge opening under said weighing mechanism and also a by-pass around said weighing mechanism and conveyor when the conveyor unit is shifted laterally of said inlet, means for stopping said conveyor when a predetermined load has reached the weighing mechanism, means for discharging said load from the mechanism and means for starting said conveyor again after said load has been discharged, said weighing mechanism comprising a weighing hopper supported on scales, said means for stopping said conveyor comprising an electrical switch operated by said scales, said means for discharging said load from said weighing mechanism comprising a gate in the bottom of said hopper and a releasable latch mechanism for said gate controlled by said switch and responsive only to movement of the scales, and said means for starting the conveyor again after the load has been discharged comprising an electrical switch operated by the closing of the gate on the hopper.

15. A device for dispensing solid aggregate material comprising an inlet structure for the material, a framework mounted in said device and arranged with rollers, a lateral conveyor unit of the endless belt type movably mounted on said rollers and normally positioned below said inlet structure so as to receive material therefrom, a weighing mechanism normally positioned below the discharge end of said conveyor and arranged to receive material therefrom, means for driving said conveyor, means to shift said conveyor unit bodily on said rollers to one side of said inlet structure, and a discharge structure under said inlet structure below the level of said conveyor and under said weighing mechanism so as to provide a discharge opening under said weighing mechanism and also a by-pass around said weighing mechanism and conveyor when the conveyor unit is shifted to one side of said inlet.

ARTHUR J. STOCK.

CERTIFICATE OF CORRECTION.

Patent No. 2,372,746. April 3, 1945.

ARTHUR J. STOCK.

It is hereby certified that error appears in the printed specification of the above numbered patent requiring correction as follows: Page 3, second column, line 24, for "contracting" read --contacting--; page 6, second column, line 55, claim 8, before the word "for" insert --means--; and that the said Letters Patent should be read with this correction therein that the same may conform to the record of the case in the Patent Office.

Signed and sealed this 31st day of July, A. D. 1945.

Leslie Frazer (Seal) Acting Commissioner of Patents.